US012309197B2

(12) United States Patent
Costa

(10) Patent No.: US 12,309,197 B2
(45) Date of Patent: May 20, 2025

(54) REAL-TIME DETECTION OF SITE PHISHING USING MESSAGE PASSING NEURAL NETWORKS (MPNN) ON DIRECTED GRAPHS

(71) Applicant: Akamai Technologies, Inc., Cambridge, MA (US)

(72) Inventor: Nadav George Costa, Ramat Gan (IL)

(73) Assignee: Akamai Technologies, Inc., Cambridge, MA (US)

( * ) Notice: Subject to any disclaimer, the term of this patent is extended or adjusted under 35 U.S.C. 154(b) by 317 days.

(21) Appl. No.: 18/084,593

(22) Filed: Dec. 20, 2022

(65) Prior Publication Data

US 2024/0205263 A1 Jun. 20, 2024

(51) Int. Cl.
*H04L 9/40* (2022.01)
*G06N 3/08* (2023.01)

(52) U.S. Cl.
CPC ........... *H04L 63/1483* (2013.01); *G06N 3/08* (2013.01)

(58) Field of Classification Search
CPC .... H04L 63/1483; G06N 3/042; G06N 3/045; G06N 3/08
See application file for complete search history.

(56) References Cited

U.S. PATENT DOCUMENTS

| | | | | |
|---|---|---|---|---|
| 9,386,037 B1* | 7/2016 | Hunt | .................. | H04L 63/1433 |
| 11,176,462 B1* | 11/2021 | Bastas | .................... | G16B 50/10 |
| 11,636,347 B2* | 4/2023 | Dai | ........................ | G06N 3/088 |
| | | | | 706/25 |
| 11,636,920 B2* | 4/2023 | Xiong | ...................... | G06N 3/08 |
| | | | | 703/11 |
| 2010/0088668 A1* | 4/2010 | Yoshihama | ............... | G06F 8/10 |
| | | | | 717/105 |
| 2014/0033307 A1* | 1/2014 | Schmidtler | ......... | H04L 63/1483 |
| | | | | 726/22 |
| 2014/0053064 A1* | 2/2014 | Weber | .................. | G06F 16/9574 |
| | | | | 715/234 |
| 2015/0244728 A1* | 8/2015 | Tao | ..................... | H04L 63/1483 |
| | | | | 726/23 |
| 2020/0204587 A1* | 6/2020 | Hunt | ..................... | G06F 21/128 |
| 2020/0356466 A1* | 11/2020 | Thangam | ................ | G06F 40/12 |
| 2021/0049441 A1* | 2/2021 | Bronstein | ............... | G06F 17/11 |
| 2022/0309685 A1* | 9/2022 | Ramezani | .............. | G06T 7/246 |
| 2022/0327168 A1* | 10/2022 | Zhuang | .................. | G06N 3/045 |
| 2022/0353292 A1* | 11/2022 | Quint | ..................... | G06N 3/043 |

(Continued)

OTHER PUBLICATIONS

Zhang et al. "Phishing Detection Using Neural Network" [Online], 2012 [Retrieved on: Dec. 27, 2024], CS229 lecture notes 34, Retrieved from: <https://ningxiaz.github.io/code/phishing/phishing.pdf> (Year: 2012).*

(Continued)

*Primary Examiner* — Eric W Shepperd
(74) *Attorney, Agent, or Firm* — David H. Judson

(57) ABSTRACT

Website phishing detection is enabled using a Message Passing Neural Network (MPNN) that scores requested HTML with a likelihood of being a phishing website. The technique leverages the assumption that the HTML in a phishing website often presents anomalous structure or features when compared with an analogous benign website. Once a phishing site is detected, a given mitigation action is then taken.

21 Claims, 13 Drawing Sheets

(56) References Cited

U.S. PATENT DOCUMENTS

2023/0082481 A1* 3/2023 Azarafrooz ......... H04L 63/1483
　　　　　　　　　　　　　　　　　　　726/23
2023/0403294 A1* 12/2023 Bazalgette .......... H04L 63/1441
2024/0114053 A1* 4/2024 Katz ................... H04L 63/1483
2024/0291863 A1* 8/2024 Cohen ................ H04L 63/1483
2024/0333730 A1* 10/2024 Wang ................. H04L 63/1416

OTHER PUBLICATIONS

Aljofey eta l., "An Effective Phishing Detection Model Based on Character Level Convolutional Neural Network from URL" [Online], Sep. 15, 2020 [Retrieved on: Dec. 27, 2024], MDPI Electronics 2020(9), Retrieved from: < https://www.mdpi.com/2079-9292/9/9/1514 > (Year: 2020).*

PCT/US2023/084986, International Search Report and Written Opinion mailed on Apr. 7, 2024, 7 pages.

Bilot, T., "PhishGNN: A Phishing Website Detection Framework using Graph Neural Networks," 19th International Conference on Security and Cryptography, Jul. 2022, Lisbon, France. pp. 428-435. Jul. 31, 2022 (Jul. 31, 2022), 9 pages.

Jain, AK , et al., "Towards detection of phishing websites on client-side using machine learning based approach," Telecommunication Systems. Aug. 2018; 68:687-700. Aug. 31, 2018 (Aug. 31, 2018), 15 pages.

Velickovic, et al., "Graph Attention Networks," ICLR International Conference on Learning Representations (ICLR) 2018.

\* cited by examiner

| ATTRIBUTE NAME | VISIBLE TO END-USER | DESCRIPTION |
|---|---|---|
| tag_name | NO | NODE TYPE |
| ID | NO | NODE ID |
| inner_text | YES | NODE TEXT |
| HREF | YES | ADDRESS OF AN ACTIVE LINK |
| CHILDREN | NO | LIST OF THE PERTINENT CHILDREN |

FIG. 4

```
{
  "href": "https://sec.userseservice.com/%7B%7B%20@BASE%20%7D%7D/",
  "id": " ",
  "inner_text": " ",
  "tag_name": "A"
  "children": [
    {
      "children": [],
      "href": null,
      "id": " ",
      "inner_text": " ",
      "tag_name": "IMG"
    }
  ],
},
```

FIG. 5

| FILE | HYPERLINKS | LABEL/SCORE |
|---|---|---|
| mkxchange.com_5edade5df8d0d7e396fae2adb811bf3fe82371a9.json | https://mkxchange.com/citizen/login.php  702 | PHISHING/0.9604702 |
| | https://www.citizensbank.com/learning/ | |

700

| FILE | HYPERLINKS | LABEL/SCORE |
|---|---|---|
| onlinerweb2-dash9navyfcu.com_3e497f900014ee7e0e41cd4223f77bd30a09e4029.json | http://onlinerweb2-dash9navyfcu.com/webir/login/login  708 | PHISHING/0.9917104 |
| | https://www.navyfederal.org | |

706

| FILE | HYPERLINKS | LABEL/SCORE |
|---|---|---|
| 5five3readerdocfifth.com_080b085a7d616c09f4ea01cbffd28a07e7e65fa4.json | https://5five3readerdocfifth.com/#  714 | PHISHING/0.65 |

712

FIG. 7 https://mkxchange.com/citizen/login.php
['https', '/', '/', 'mk', '##x', '##chang', '##e', '.', 'com', '/', 'citizen', '/', 'log', '##in', '.', 'php']

https://www.citizensbank.com/learning/
['https', '/', '/', 'www', '.', 'citizens', '##bank', '.', 'com' '/', 'learning', '/']

FIG. 10

REAL-TIME DETECTION OF SITE PHISHING USING MESSAGE PASSING NEURAL NETWORKS (MPNN) ON DIRECTED GRAPHS

BACKGROUND

Technical Field

This application relates generally to network security and, in particular, to techniques that detect phishing attacks on websites.

Brief Description of the Related Art

Phishing is a type of social engineering where an attacker sends a fraudulent (e.g., spoofed, fake, or otherwise deceptive) message designed to trick a person into revealing sensitive information to the attacker or to deploy malicious software on the victim's infrastructure like ransomware. Phishing attacks have become increasingly sophisticated and often transparently mirror the site being targeted, allowing the attacker to observe everything while the victim is navigating the site, and transverse any additional security boundaries with the victim.

BRIEF SUMMARY

According to this disclosure, website phishing detection is enabled using deep learning for modeling Hypertext Markup Language (HTML) with a likelihood of being a phishing website. The technique leverages the assumption that the HTML of a phishing website often presents anomalous structure or features when compared with an analogous benign website. The solution comprises a classification algorithm that implements a Message Passing Neural Network (MPNN) architecture that is trained against a data set of identified benign and phishing websites. The resulting algorithm models HTML of a site by a self-contextual analysis. In particular, the classification algorithm processes HTML by systematically aggregating interactions over the graph-connected HTML nodes so that a full and comprehensive representation is obtained. To this end, preferably the processing operates on directed graphs (DGs) of HTML Document Object Model (DOM) trees and upon which messages are passed; using this approach, features of nodes in the DG adaptively aggregate information from other nodes of the HTML towards a useful summary representation. Once a phishing site is detected, a given mitigation action is then taken.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 4 is a table depicting how an element in the DOM tree is constructed with an attribute set;

FIG. 5 is an actual DOM-tree node for a login page of a site;

FIG. 7 depicts several examples of hyperlink anomalies in a site or page that are detected using the techniques herein;

FIG. 10 depicts representative tokens created by the Bidirectional Encoder Representations from Transformers (BERT) encoding engine according to the techniques herein;

DETAILED DESCRIPTION

Figure 1:
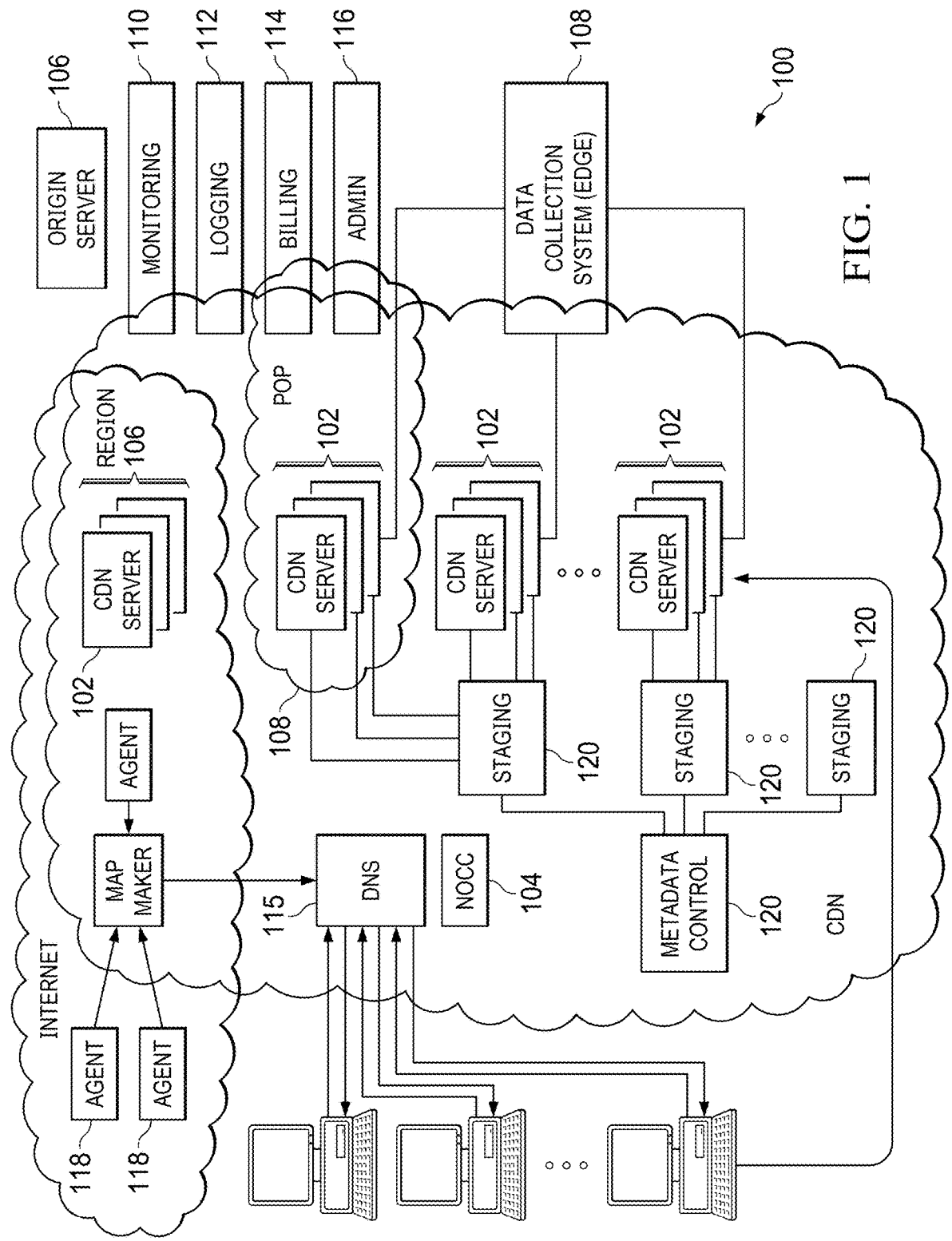
FIG. 1 is a block diagram illustrating a known distributed computer system configured as a content delivery network (CDN)

A representative system in which real-time phishing detection for websites is implemented according to this disclosure is depicted in FIG. 1. The system is a content delivery network (CDN) that is a shared infrastructure provided by a service provider and that is used by content providers to deliver their websites. This implementation is not intended to be limited, as the techniques herein may be practiced in any type of computer system, in a standalone manner or in association with a website, or as a particular function of some other computer-implemented system, device, process, or the like.

In this known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a Domain Name System Canonical Name (DNS CNAME)) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
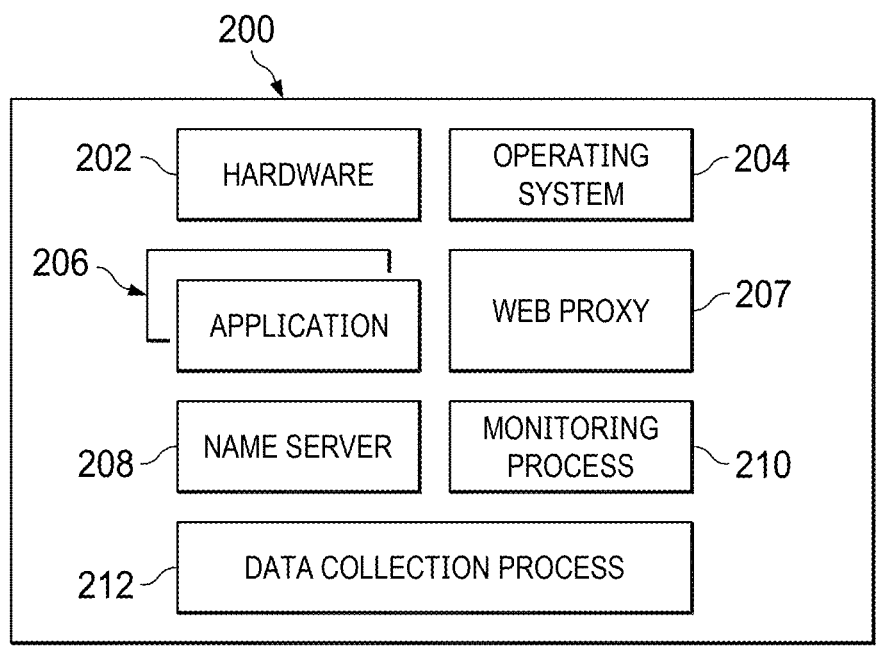
FIG. 2 is a representative CDN edge machine configuration.

As illustrated in FIG. 2, a given machine 200 comprises commodity hardware (e.g., an Intel® processor) 202 running an operating system kernel (such as Linux or variant) 204 that supports one or more applications 206a-n. To facilitate content delivery services, for example, given machines typically run a set of applications, such as an HyperText Transfer Protocol (HTTP) proxy 207 (sometimes referred to as a global host process), a name server 208, a local monitoring process 210, a distributed data collection process 212, and the like. The HTTP proxy 207 or "edge server") serves web objects, streaming media, software downloads and the like. A CDN edge server is configured to provide one or more extended content delivery features, preferably on a domain-specific, customer-specific basis, preferably using configuration files that are distributed to the edge servers using a configuration system. For example, a given configuration file preferably is Extensible Markup Language (XML)-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

Figure 3:
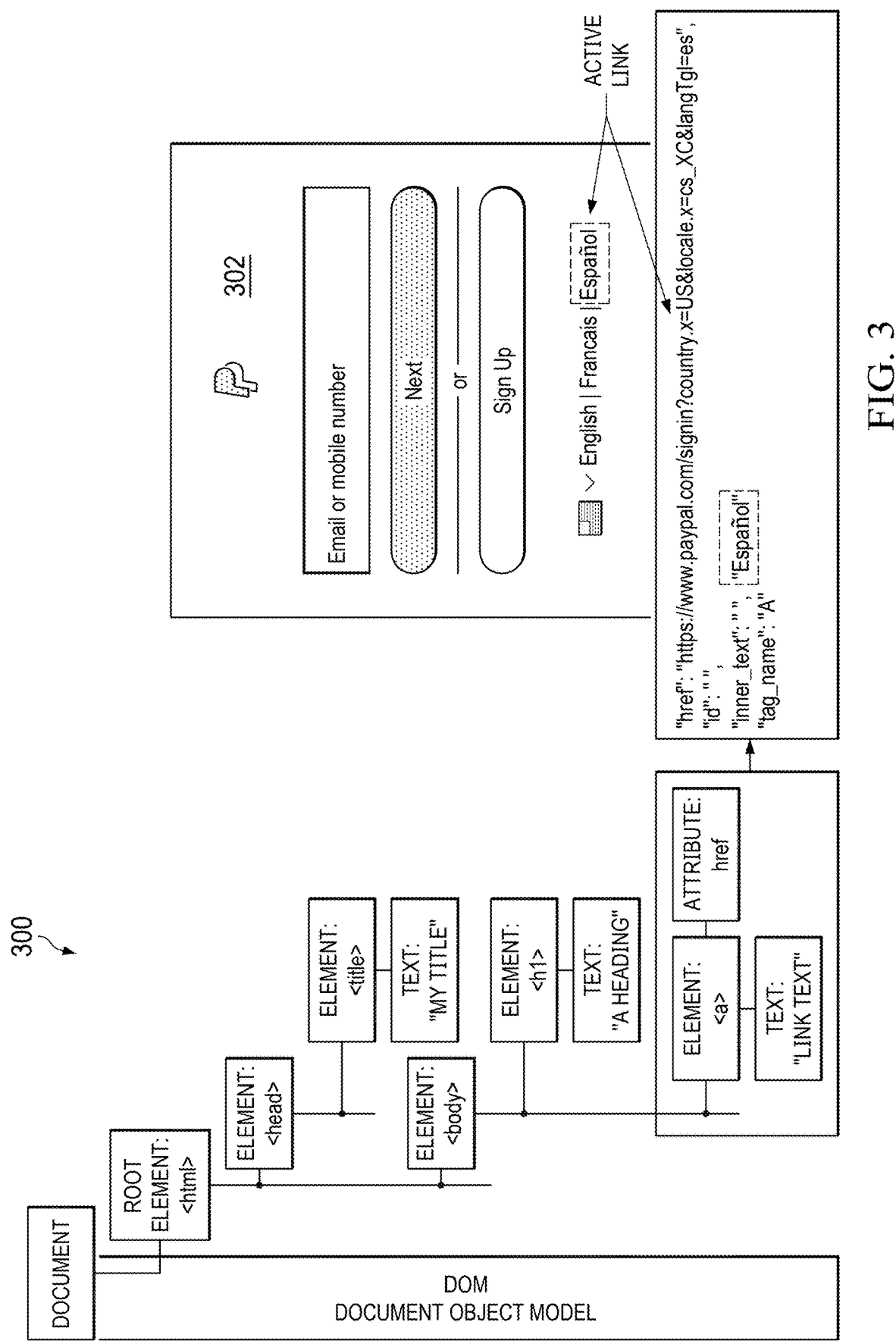
FIG. 3 depicts how a web browser represents a web page internally in a Document Object Model (DOM)

When a client web browser receives a web page (or "document") from a website, such as a website supported on the CDN edge servers described above, the browser creates a Document Object Model (DOM) of the page. In other words, a DOM is how a web browser represents a web page internally. FIG. 3 depicts this process. As depicted, each node (element) of the DOM-tree 300 in FIG. 3 is an object that contains several attributes (features) alongside with a list of its pertinent child nodes. DOM-tree 300 is sometimes referred to herein as an HTML-DOM. FIG. 3 depicts the HTML page itself, in this case a login page 302 designed to receive a user credential. Typically, an element in the tree is constructed with an attribute set as shown in the table in FIG. 4 An example of a DOM-tree node for a login page of another site is shown in FIG. 5.

Figure 6:
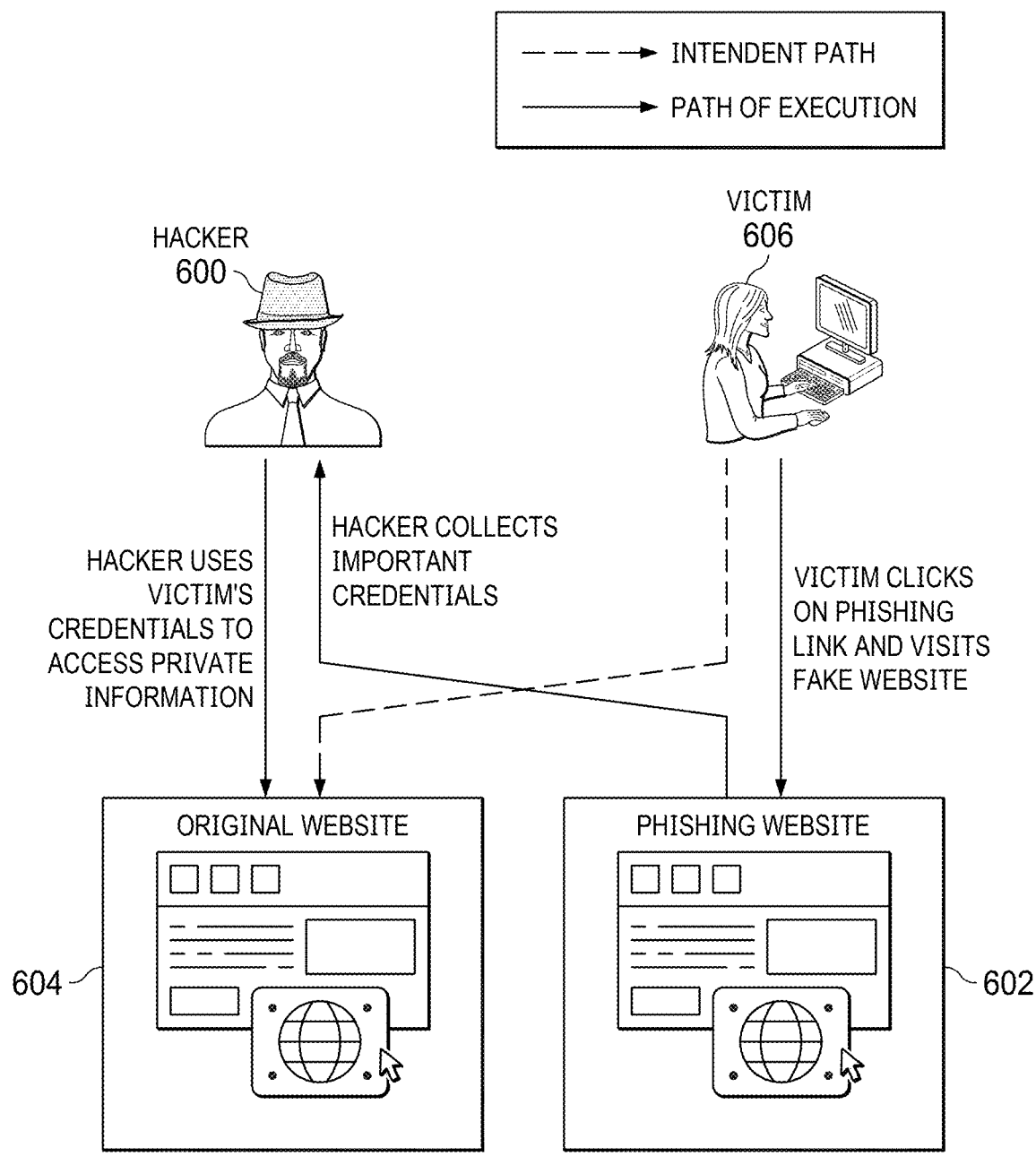
FIG. 6 depicts a representative phishing attack.

FIG. 6 depicts the underlying concept of a phishing attack. Here, a hacker 600 has created a phishing website or page 602 corresponding to an original website or page 604. The victim 606 of the attack intends to navigate the original website 604 but is tricked/fooled into navigating the phishing site 600 instead. While navigating the phishing site, the hacker 600 then collects the victim's credentials and uses them to access the victim's private information on the original website. As will be seen, the technique of this disclosure is designed to assign the likelihood that a site, such as site 602, is a phishing attack. As will be described, this detection leverages deep learning and, in particular, a neural network that has been trained, e.g., as a binary classifier, to detect phishing sites. In one example embodiment, the training procedure of the model relies on a labeled corpus data of identified phishing and benign sites. As usual in the realm of machine learning, it is best if the distribution of the training data set stands truthfully compared with the distribution of live/production data upon which the classifier is expected to operate. Without intending to be limiting, information about phishing sites to be used for training may be obtained from a data source, e.g., PhishTank, which provides community-based phish detection data that can be downloaded or obtained via an API.

Once the model is trained to detect/classify phishing attacks, real-time phishing detection is then carried out against live traffic using the trained model.

According to this disclosure, and as will be described, the phishing detection algorithm implements a Message Passing Neural Network (MPNN) to facilitate detection phishing sites. The underlying assumption in this approach is that often an HTML's phishing website presents anomalous structure or features when compared with an analogous benign website. An MPNN is a type of Graph Neural Network (GNN). Generally, a GNN is a network that operates on graphs having (most generally) node and edge features as an input and computes a function that depends on those features while utilizing the graph structure. An MPNN is a type of GNN wherein node features are propagated by exchanging messages between connected nodes. An architecture of the type may include multiple propagation layers, and a node is updated based on an aggregation of the features of its neighbor nodes and/or corresponding edges. There may be several different types of aggregation functions (typically parametric), e.g., convolutional, attentional and/or message passing functions. As will be described, the phishing detection classifier of this disclosure implements the MPNN to identify site anomalies in the site's HTML via features such as hyperlinks, inner text and the like. FIG. 7 depicts several examples.

Indeed, in a first example, the file 700 includes the hyperlink 702 that contains the "citizen" subdirectory, and a second hyperlink that includes "citizensbank" domain, which is by no accident the domain of the original webpage. Based also on this mix of hyperlinks structure, the algorithm has determined that there is a high likelihood (0.9604702) that the page is a phishing attack. Similarly, in the second example, the file 706 is includes the hyperlink 708 that contains the "onlineweb2-dash9navyfcu" domain with the "navy" name hidden inside, and a second hyperlink that includes "navyfederal" domain, which is again by no accident the domain of the original webpage. Here, also this mixture of hyperlinks promote high score for likelihood of phishing, which in this case reads 0.9917104. In the third example, the file 712 includes a single hyperlink 714 across the file, which may indicate a phishing website, and obtains the phishing likelihood score of 0.65. Of course, these are just representative examples of the approach (and the scoring) herein.

Once the phishing site is detected according to this disclosure, an automated mitigation action can then be taken. The nature of the mitigation action may vary depending on implementation but typically involves one of: issuing a notification (e.g., a warning that the site is potentially suspect), logging the attack, implementing a blocking or sandboxing operation to stop or isolate the attack, forwarding the detection information to other security systems for further action (e.g., combining the result with other results or heuristics generated from other detection techniques), and the like.

Real-Time Detection of Site Phishing Using HTML DOM Trees

With the above as background, the technique of this disclosure is now described.

According to this disclosure, a phishing detection algorithm performs a deep textual analysis on HTML and, in particular, DOM-tree inputs. In operation, the technique takes as input data the HTML (in the form of the DOM tree) of the site/page and applies the MPNN over the HTML to assign a likelihood that the page is a phishing attack. As will be described, the HTML-based classifier implemented by the algorithm provides significant advantages, as typically the phishing attack vector can be identified in one or more anomalous features of the phishing site's DOM tree.

The technique herein includes a pre-processing stage, followed by a computational stage, each of which is now described.

Figure 8A:
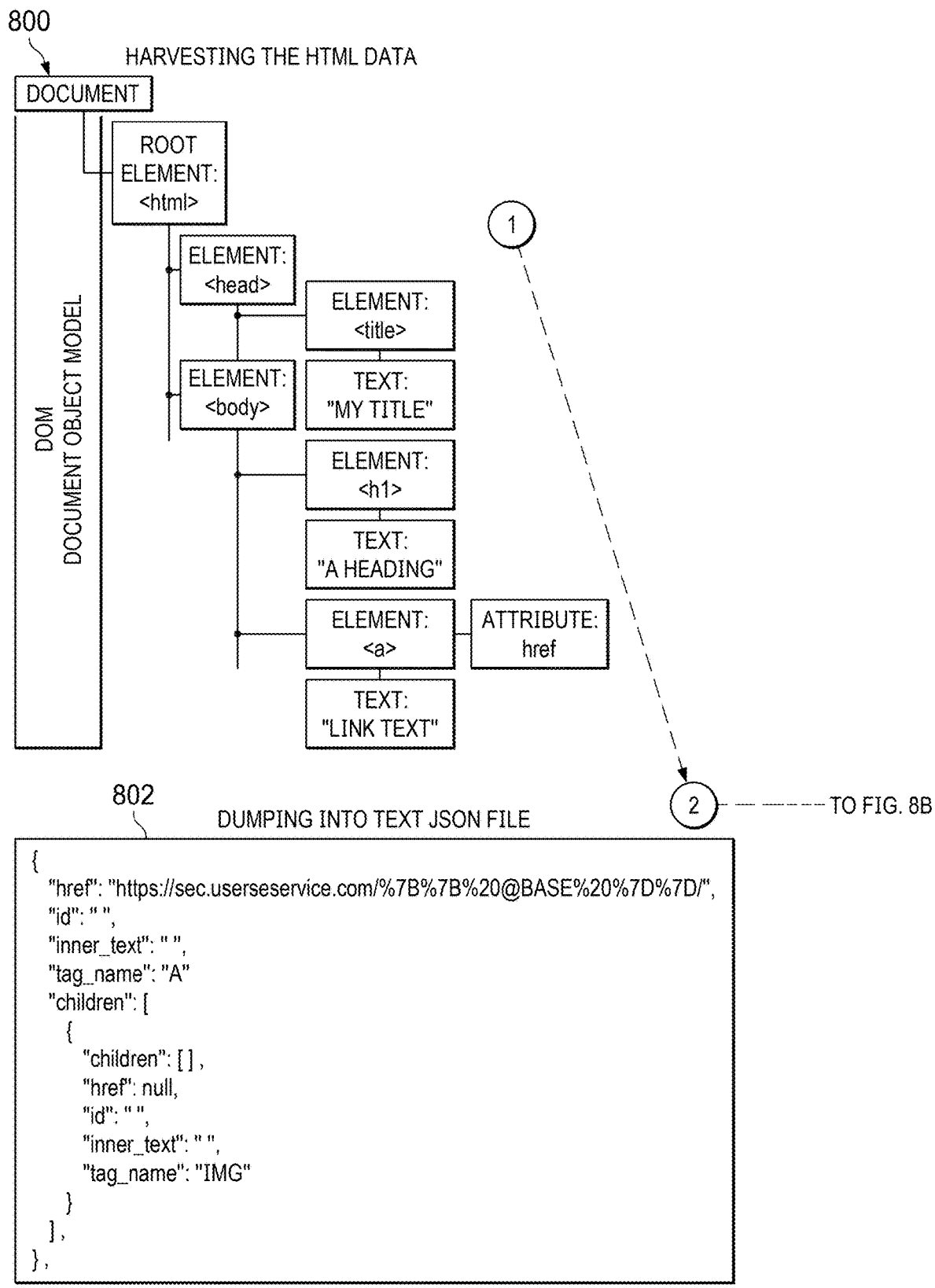
FIGS. 8A and 8B together depict a pre-processing pipeline that is used to prepare an HTML DOM tree for classification by the MPNN according to this disclosure.
Figure 8B:
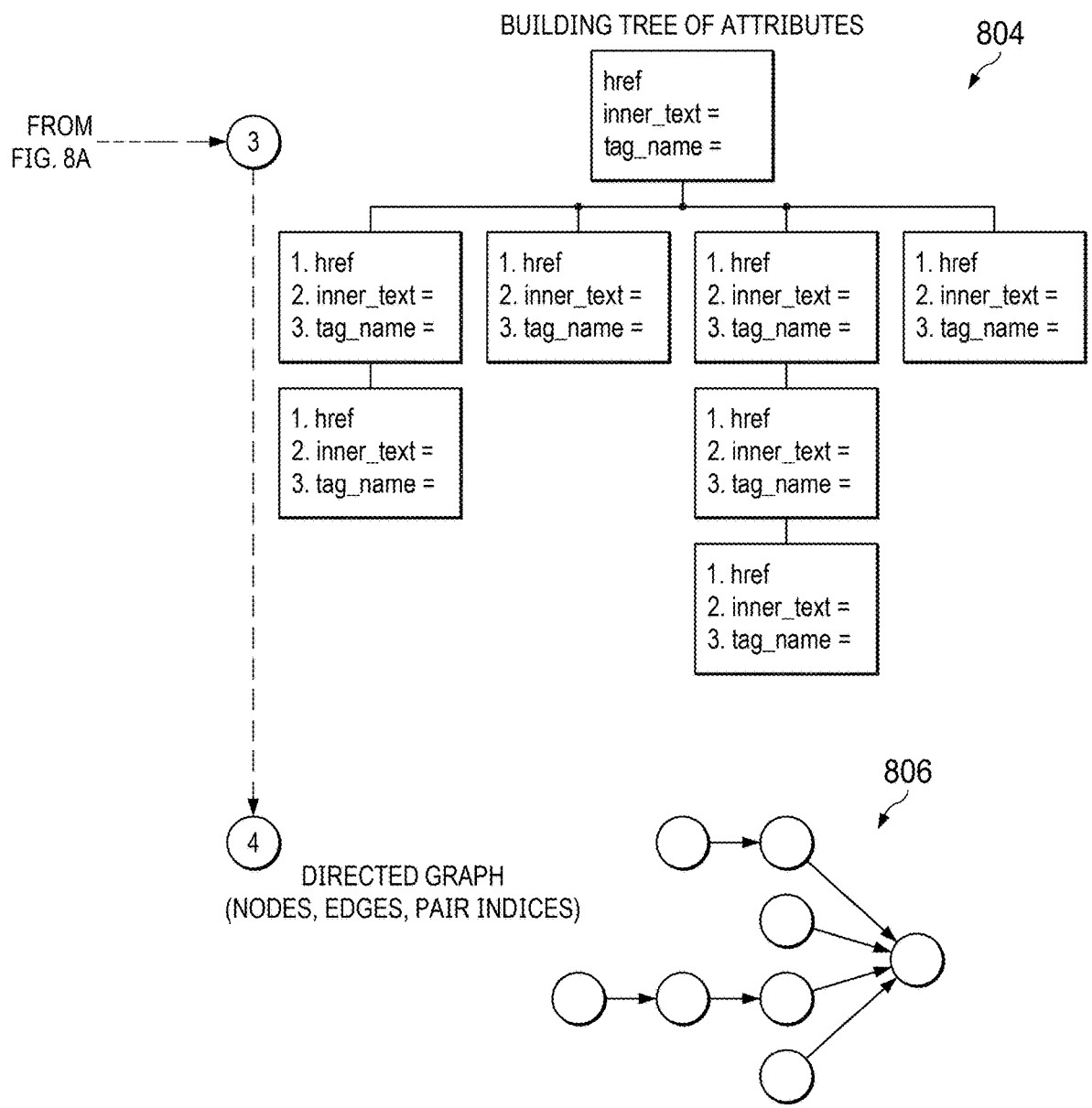

In particular, once an HTML-DOM (the DOM tree of a page) is retrieved for analysis, a data pre-processing pipeline is first applied to it to generate a Directed Graph (DG) with predefined textual attributes. The pre-processing pipeline is depicted in FIG. 8 FIGS. 8A-8B. In this embodiment of the pre-processing, the HTML-DOM 800 is placed into a JavaScript Object Notation (JSON) file 802, which file is then parsed into a tree structure 804 of predefined attributes that is then transformed into the DG 806. In particular, the HTML-DOM 800 is retrieved at step (1). At step (2), the file is placed/converted into the JSON file 802. At step (3), the tree-based data structure 804 is formed with predefined set of attributes from the JSON file 802. At step (4), the tree 804 is further transformed into the directed graph (DG) 806. Thus, the output of the pre-processing pipeline is the directed graph of step (4), where each node contains a set of predefined attributes at a raw level of representation. It should be appreciated that using just a single JSON file (from step (2)), the remaining pipeline (steps (3) and (4)) can be applied more than one time (iteratively) and where, at each such iteration, different filtering can be applied to result in a set of different trees and graphs. For example, and using the iterative approach based on the JSON file, there can be different results for steps (3) and (4) of the process by using different tag names filtering. In addition, the attributes that are to be included in the result can also be controlled; as will be seen, this iterative processing is helpful to allow the inclusion of relevant data for analysis. In one example implementation, two (2) different DGs per a JSON file are generated, wherein each DG includes a different set of tag names and different attributes.

Figure 9:
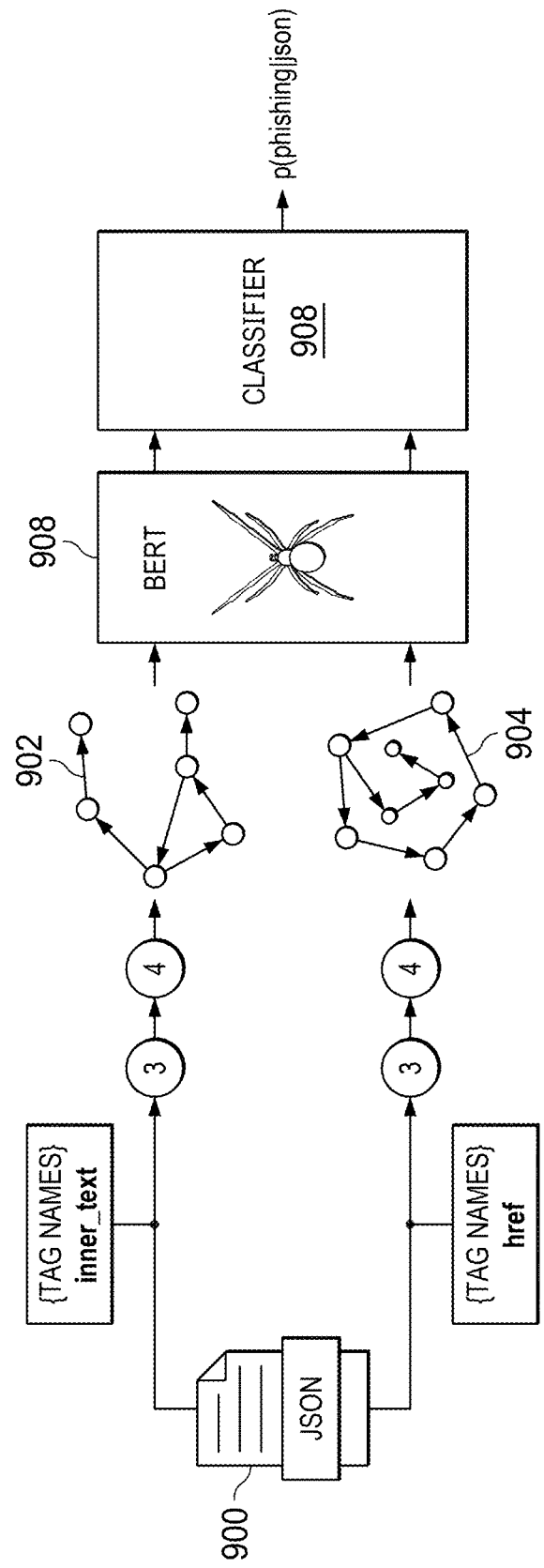
FIG. 9 depicts a representation of the pre-processing pipeline connected to the MPNN classifier.

In a representative embodiment, and as depicted in FIG. 9, steps (3) and (4) of the pipeline are applied per JSON file 900 to obtain two (2) different directed graphs, e.g., a hyperlinks (href) directed graph 902, and a inner text (inner_text) DG 904. As depicted, the two branches of computation have in general different sets of tag_names to follow. Preferably, the tag_names attribute is used for purpose of filtering by the algorithm. In particular, the attributes of href (hyperlinks) and inner_text are defined as active features. This means that the algorithm (described further below) directly encodes and applies computational layers upon these features, while each DG (typically one per feature) is prepared and manipulated independently. To create these DGs, and as described previously, two different DOM-trees (from the same JSON sample file) are generated but pruned differently depending on the input tag_names. In a preferred embodiment, a pruning rule is set. According to this rule, a tree leaf is pruned unless the pertinent tag_name attribute is found within the predefined set of tag_names. This process is then repeated iteratively with the pruned tree of a previous iteration as a new input for pruning. The tree pruning process is inherently the last computational part of step (3) previously described. The final step (4) of the data pre-processing pipeline preferably is called with the pruned trees of the previous step (3), and in turn generates a DG of encoded features. In other words, the process generates a DG of encoded inner_text, and a corresponding DG for the href feature. This completes the pre-processing pipeline.

The directed graphs generated in this manner are then used to facilitate classification (of the input) by the detection network or algorithm 906 (sometimes referred to as the "classifier" and shown here in simplified form). In general, and as depicted in this simplified representation, the detection algorithm 906 receives as input the results of a natural language processing operation 908 that is applied to the above-described directed graphs. As will be described below, and for each feature (hyperlink/inner text DG), the classifier implements message passing and a self-attention network that together comprise an MPNN. The classifier outputs a likelihood score, in this embodiment, whether input json file 900 is a phishing site.

Natural Language Processing (NLP) processing 908 applies a pretrained language encoder to the two directed graphs. In a typical (but non-limiting implementation), the encoder is BERT (Bidirectional Encoder Representations from Transformers), a transformer-based machine learning technique for NLP. In particular, at 908, preferably the same BERT encoding engine is used for the two inner_text and href (hyperlink) features as represented in the directed graphs. In practice, this means that each identified token from the plaintext data becomes a vector of numeric numbers that can be further processed by the network. Typically, the BERT encoding includes two sequential parts, namely, a pre-processor that generates the tokens, followed by an encoder that assigns a numeric vector for each token. Several examples of resulting tokens of the BERT-based pre-processing stage for the hyperlink plain text is shown in FIG. 10, and preferably the same pre-processor is also applied for the inner_text feature.

Figure 11:
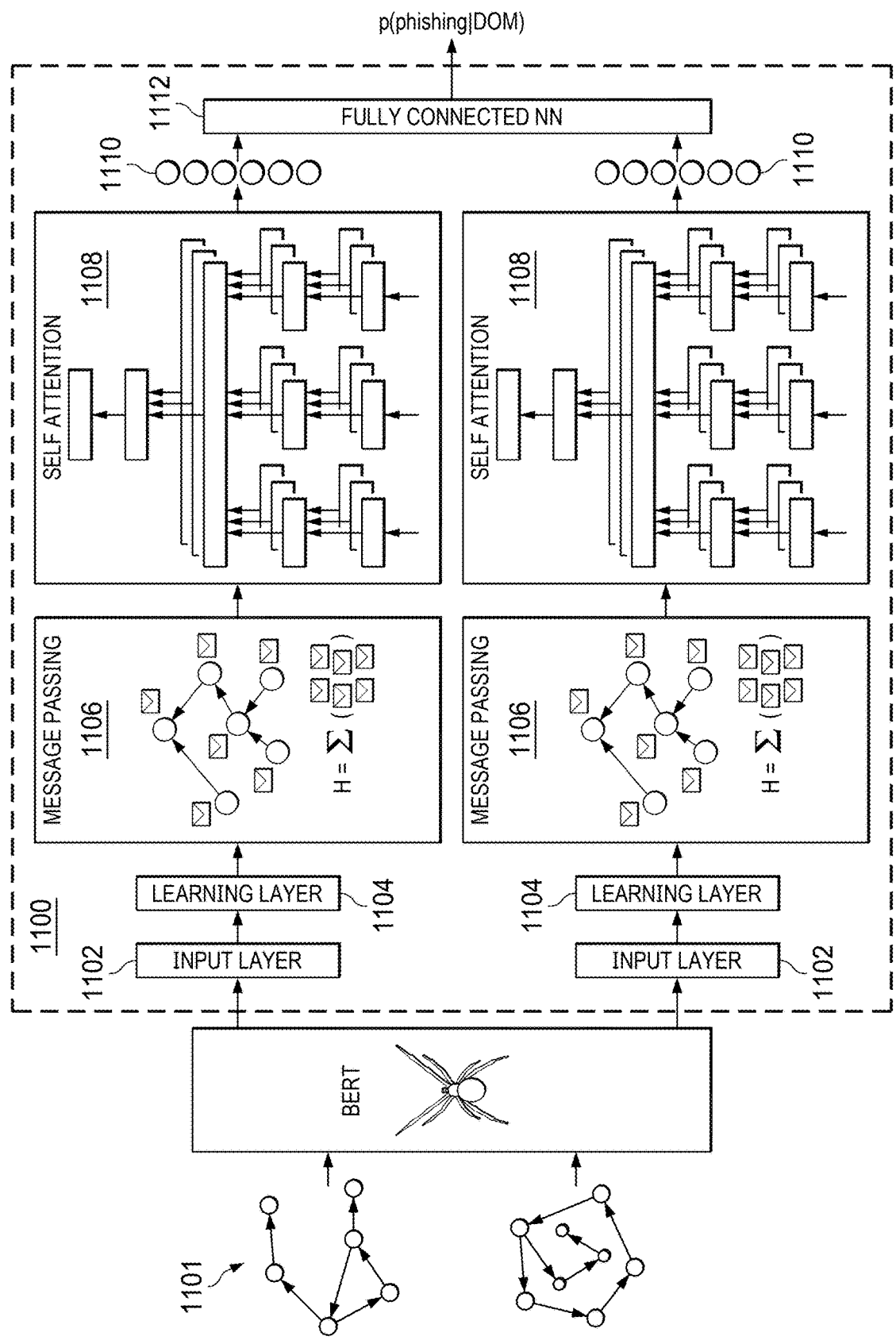
FIG. 11 depicts a schematic representation of a preferred embodiment of the classifier of this disclosure.

The following describes the phishing detection computational processing stage. As has been previously described, the algorithm is implemented in a Message Passing Neural Network (MPNN) that allows features from different nodes to directly interact so as to allow a comprehensive context for classifications. A schematic representation of a preferred embodiment of the detection network (the "classifier" as referenced above) is depicted in FIG. 11. The detection network is designed to support joint modeling of self-contained graphs such that adding new features from the DOM (in a DG form) is easily done. As depicted in FIG. 11, and per feature, the detection network 1100 preferably encompasses the following ordered computational layers: an input layer 1102, a node representation learning layer 1104, a message passing mechanism 1106, and a self-attention mechanism (an adaptive summary vector representation via attention on graph nodes, and pooling) 1108, where eventually the network concatenates graph representation vectors 1110 and feeds them to a fully-connected neural network 1112 that generates the output, namely, the likelihood that a site page (as represented by DGs 1101 derived from the HTML-DOM of the page) is a phishing page. Each of these network-layers or operations is now described.

Figure 12:
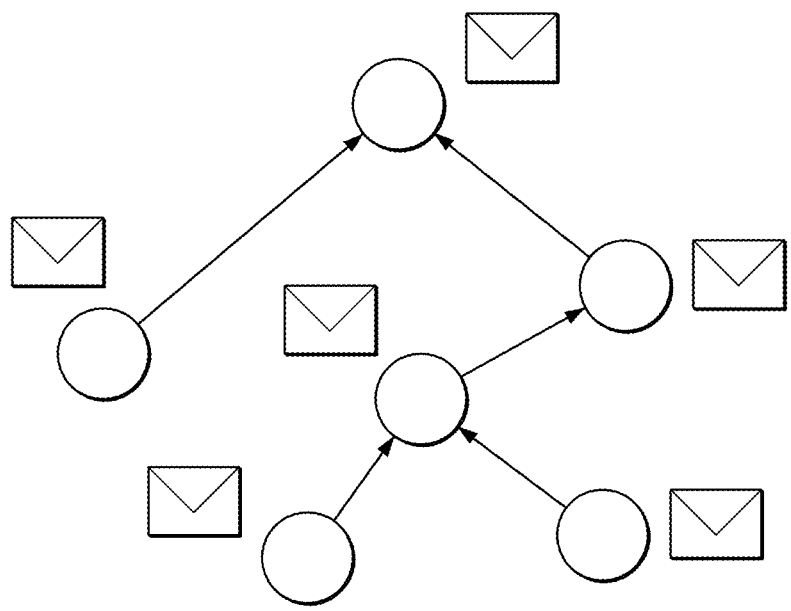
FIG. 12 depicts message passing between and among nodes over a graph.
Figure 13:
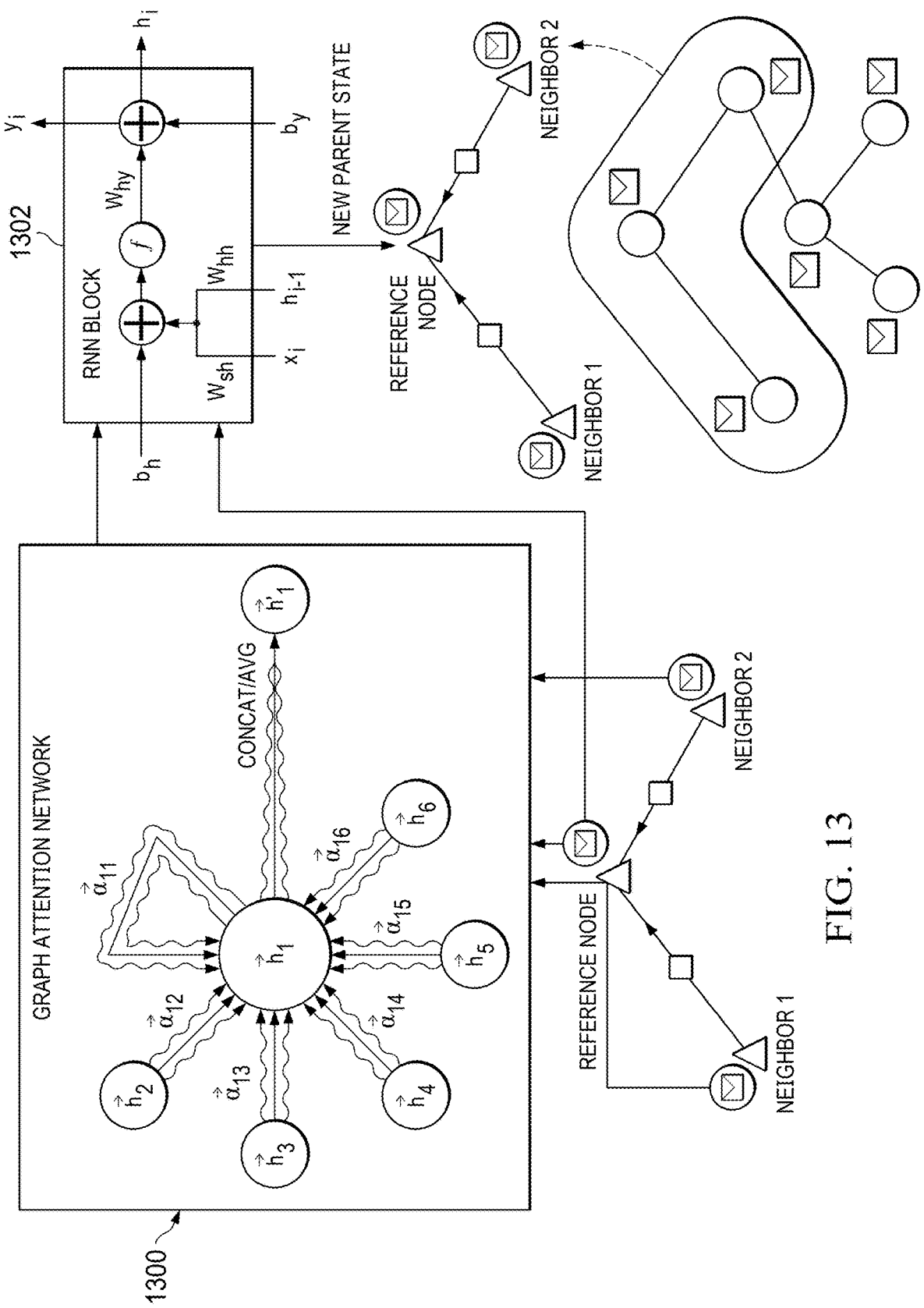
FIG. 13 depicts how a parent node in the MPNN is updated based on an adaptive aggregation of the features of its children nodes via message passing.

In particular, each computational branch in the embodiment shown in FIG. 11 has the input layer 1102. The input layer preferably has the following inputs: node feature (a tensor with the encoded node data, e.g., the BERT representation of inner_text or href), one or more feature masks (mask of the node's representations), pair indices (indices of the directly-connected nodes, namely, those connected with edges), and graph indices for the nodes. In a variant embodiment, edge features can be used for this purpose. The node representation learning layer 1104 is provided for learning an optimal aggregated representation for nodes coding from input codes (e.g., node features and feature masks). In particular, the node representation learning layer 1104 learns to adaptively aggregate an input tensor per node into a representative vector via self-attention. This vector in turn is used by the message passing mechanism 1106. This message passing on the directed graph is schematically depicted in FIG. 12. In particular, message passing is used to enable direct interactions of node features across the DOM-based DG. Specifically, and via the message passing, connected nodes (such as depicted) pass messages in-between themselves, and where the messages are sent along the direction of the connecting edge. In this way, an arbitrary target node can incorporate into its state the information received from one or more sending nodes, and then in turn pass such information forward to one or more respective receiver nodes. As noted, the message passing mechanism also implements an update scheme for node features. FIG. 13 depicts this operation. In particular, a new candidate feature vector for a receiver node is generated via a graph attention scheme (GAT) 1300; then, a target node feature vector is updated via an RNN (Recurrent Neural Network) cell 1302 using the new candidate vector (as input vector) together with the old feature vector (as context vector). Here, the RNN allows soft incorporation of the candidate vector. Typically, this message passing update method is repeated K-times (typically K=3 or 4) such that a radius of interaction among the nodes is increased. Further details regarding the graph attention scheme that is used for adaptive message filtering in the message passing process may be found in "Graph Attention Networks," International Conference on Learning Representations (ICLR) 2018, to Velickovic et al. The paper describes an attention-based architecture that performs node classification of graph-structured data. The technique computes hidden representations of each target node in the graph, by attending over its neighbors, following a self-attention strategy.

Referring back to FIG. 11, to classify the input DOM (as a phishing page, or not), the final computational stage is implemented. Preferably, the self-attention mechanism 1108 is implemented as a multi-head self-attention layer followed by dense projections to eventually feed a global average pooling layer. At this stage, the algorithm attends nodes that incorporate many parts of the DG due to the previously-described message passing. The resulting DG summary vector (from graph representation vectors 1110 in FIG. 11) is applied to the fully-connected neural network 1112. In a representative implementation, the network 1112 has an output layer of size 1 (and sigmoid activation) to produce a likelihood value (e.g., a score between 0 and 1). A value that is higher than a threshold (preferably configurable) represents a detected phishing page/site.

Preferably, and as also described, the MPNN uses, as an output layer, a self-attention layer (with pooling). An output of the self-attention layer is set for transforming a final node vector into a scalar score ($0 \leq s \leq 1$). By comparing the score to some threshold, which threshold may be configurable, the system characterizes the site/page, typically as a binary (fraudulent/not fraudulent) output. Although not depicted, the score may be written to a log or otherwise directed to other computing systems have an interest therein. The back-end may comprise a policy management system, a Security Information and Event Management (SIEM) system, a policy enforcement point (PEP), or any other type of computing system, machine, program, process, operating thread, and the like.

In operation in the CDN depicted in FIG. 1, and after the MPNN has been trained and instantiated, the real-time detection of phishing activity takes place, typically in association with a client browser-CDN edge server request-response workflow. As previously noted, the CDN edge server is configured as a machine such as shown in FIG. 2, and it forms part of the larger overlay network (although is not required). In a usual request-response flow, and after a client request to a CDN-based authoritative name service has been resolved to identify the CDN edge server, the browser issues a GET request to obtain a site page. If the edge server is configured to interact with the phishing detection system of this disclosure, it issues to the detection system a signal (or "event") that the requested page may be associated with a phishing attack and should be scored. In one example embodiment, the edge server is configured to issue the signal because one or more embedded HTML objects (e.g., an image, a graphic, a favicon, etc.) that are being delivered by the CDN will be served by the edge server in the usual delivery flow. The signaling triggers the phishing detection against the trained MPNN as has been previously described. To this end, the website is harvested by the detection system, and the pre-processing pipeline operations described above (FIG. 8) are initiated. Once the resulting JSON files are saved to a database, the detection network receives a query (e.g., against an identified .json path) for the score and generates the result. The entire end-to-end processing (from harvesting to scoring) occurs extremely fast (e.g., in under one (1) second on average), in part because the classifier architecture described herein operates on Graphics Processing Units (GPUs) that accelerate the execution time. If the score is indicative of a phishing site, the detection system provides the edge server with a response. Based on the response, the edge server takes the mitigation action, e.g., issuing a prompt to the end user that requested page is suspected of being a phishing site. In this example embodiment, a set of dedicated back-end computational and storage resources in or associated with the CDN or some other cloud-based computing environment are used for this purpose.

As also mentioned embodiment, in a variant embodiment the phishing score determined by the classifier may comprise one of several scores or metrics that are accumulated by the system in order to make the final benign/fraudulent determination for the site. In this variant, the scores from multiple detection algorithms are input to a final classifier (that uses additional signals) for this purpose.

The technique herein provides significant advantages. It provides for real-time analysis and processing of web page data by a Message Passing Neural Network (MPNN) scheme to provide a robust phishing detection and prevention mechanism. A security product or service that leverages the machine learning facilitates the detection and prevention of fraudulent activity in connection with the site. The deep learning approach of this disclosure addresses these issues by providing for real-time detection and prevention of phishing. As noted above, when a phishing site is created, a few signals of the attack become available on the fly by virtue of anomalies that are surfaced by modeling the HTML. The described technique provides a system that, based on these raw signals, learns to deliver a probability that given HTML is a phishing site/page.

As noted, typically this mechanism acts as a front-end to some other security system or device, e.g., a system that protects resources (such as web sites or pages, web or other applications, etc.) from abuse.

Typically, the machine learning is carried out in a compute cluster. Once the model is trained, it is instantiated in a detection process or machine as previously described.

The model may be re-trained with additional or updated training data.

Preferably, the threshold between a score representing a trustworthy and an untrustworthy (phishing) site/page is configurable.

Preferably, when the JSON input file is determined by the MPNN to be phishing/untrustworthy site (worse than a threshold), the attack is blocked.

When implemented in a CDN, configurations at the CDN edge may be used to coordinate collecting data to be used in initial data modeling, and to facilitate the detection and/or prevention operations based on that data.

The approach is reliable and scalable and operates in real-time with online computation demand, with detection occurring on average on a one (1) second scale.

Although not intended to be limiting, the detection is performed with low latency, reliably and at large scale.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel®-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a Compact Disc Read-Only Memory (CD-ROM), and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Other types of machine learning may be used to augment or to facilitate the building of the classifier model and computational branches as described herein.

What I claim is as follows:

1. A method of protecting an online system, comprising:
generating a Document Object Model (DOM) associated with a Hypertext Markup Language (HTML) page;
generating from the DOM one or more directed graphs, wherein a directed graph (DG) represents an HTML feature in the HTML page;
applying an encoded representation of the one or more directed graphs through a Message Passing Neural Network (MPNN), the MPNN having been trained by analyzing interactions between connected HTML nodes of sites in a training data set, to generate a likelihood that the HTML page is a phishing page; and
upon a determination that the HTML page is likely a phishing page, taking a given mitigation action with respect to the HTML page.

2. The method as described in claim 1 wherein the MPNN analyzes the interactions using message passing.

3. The method as described in claim 2 wherein the HTML feature is one of: a hyperlink, HTML inner text, and a combination of a hyperlink and HTML inner text.

4. The method as described in claim 3 wherein the one or more directed graphs include a directed graph associated with a hyperlink, and a directed graph associated with HTML inner text.

5. The method as described in claim 1 wherein generating the one or more directed graphs from the DOM comprises:
placing the DOM into a JavaScript Object Notation (JSON) file;
parsing the JSON file into a tree data structure of defined HTML attributes; and
processing the tree data structure into a directed graph.

6. The method as described in claim 5 wherein the processing of the tree data structure is carried out iteratively with respect to filtering criteria to generate the directed graphs.

7. The method as described in claim 6 wherein the filtering criteria comprise HTML tag names.

8. The method as described in claim 1 wherein the encoded representation is generated by a pretrained language encoder.

9. The method as described in claim 8 wherein the pretrained language encoder is BERT.

10. The method as described in claim 1 wherein applying the representation through the MPNN comprises, for each HTML feature:
passing the representation through an input layer;
passing an output from the input layer through a node representation learning layer; and
passing an output from the node representation learning layer though a message-passing attention layer.

11. The method as described in claim 10 wherein the message passing attention layer is a multi-head self-attention layer followed by dense projections that feed a pooling layer.

12. The method as described in claim 11 wherein the multi-head self-attention layer and the pooling layer generate a vector graph representation.

13. The method as described in claim 12 wherein the vector graph representation is supplied to a fully-connected neural network that generates the likelihood that the HTML page is a phishing page.

14. The method as described in claim 1 wherein the determination occurs in real-time.

15. The method as described in claim 1 further including training the MPNN using the training data set, the training data set comprising a labeled corpus of benign and phishing sites.

16. An apparatus for protecting an online system, comprising:
one or more hardware processors; and
computer memory holding computer program code executed by the one or more hardware processors and configured to:
generate a Document Object Model (DOM) associated with a Hypertext Markup Language (HTML) page;
generate from the DOM one or more directed graphs, wherein a directed graph (DG) represents an HTML feature in the HTML page;
apply an encoded representation of the one or more directed graphs through a Message Passing Neural Network (MPNN), the MPNN having been trained by analyzing interactions between connected HTML nodes of sites in a training data set, to generate a likelihood that the HTML page is a phishing page; and
upon a determination that the HTML page is likely a phishing page, take a given mitigation action with respect to the HTML page.

17. The apparatus as described in claim 16 wherein the MPNN analyzes the interactions using message passing.

18. The apparatus as described in claim 17 wherein the HTML feature is one of: a hyperlink, HTML inner text, and a combination of a hyperlink and HTML inner text.

19. The apparatus as described in claim 16 wherein the computer program code is further executed by the one or more hardware processors to train the MPNN using the training data set, the training data set comprising a labeled corpus of benign and phishing sites.

20. A phishing detection system, comprising:
a server executing in a hardware platform and configured to interoperate with a requesting client; and
a back-end infrastructure configured to receive signaling forwarded by the server during an interaction with the requesting client with respect to a website, the back-end infrastructure comprising hardware and software configured in response to receipt of the signaling to:
obtain an HTML page;
generate a Document Object Model (DOM) associated with the HTML page;
generate from the DOM one or more directed graphs, wherein a directed graph (DG) represents an HTML feature in the HTML page;
apply a representation derived from the one or more graphs through a Message Passing Neural Network (MPNN), the MPNN having been trained by analyzing interactions between connected HTML nodes of sites in the DOM a training data set;
generate a score indicative of whether the HTML page is a phishing page; and
forward the score to the server for handling.

21. The phishing detection system as described in claim 20 wherein, in response to receipt of the score, the server issues a notification to the requesting client that the website is a phishing site.

* * * * *